US007565628B2

(12) United States Patent  (10) Patent No.: US 7,565,628 B2
Kim et al.  (45) Date of Patent: Jul. 21, 2009

(54) FUNCTIONAL ICON DISPLAY SYSTEM AND METHOD

(75) Inventors: Tae Hun Kim, Seoul (KR); Boem Young Woo, Gyeonggi-do (KR); Jeong Hyuyk Yoon, Seoul (KR); Hyun Ju Ahn, Seoul (KR); Seung Sook Han, Gyeonggi-do (KR); Jun Serk Park, Seoul (KR); Ho Sang Cheon, Seoul (KR)

(73) Assignee: LG Electronics Inc., Seoul (KR)

( * ) Notice: Subject to any disclaimer, the term of this patent is extended or adjusted under 35 U.S.C. 154(b) by 6 days.

(21) Appl. No.: 11/696,386

(22) Filed: Apr. 4, 2007

(65) Prior Publication Data

US 2007/0245269 A1 Oct. 18, 2007

(30) Foreign Application Priority Data

Apr. 18, 2006 (KR) .................... 10-2006-0034953

(51) Int. Cl.
*G06F 3/048* (2006.01)
(52) U.S. Cl. ....................................... 715/856; 715/810
(58) Field of Classification Search ................. 715/810, 715/856
See application file for complete search history.

(56) References Cited

U.S. PATENT DOCUMENTS

| 6,037,937 | A  | * | 3/2000 | Beaton et al. ............... 715/764 |
| 6,246,411 | B1 | * | 6/2001 | Strauss ....................... 715/863 |
| 6,256,027 | B1 | * | 7/2001 | Jeong et al. ................. 715/788 |
| 6,865,719 | B1 | * | 3/2005 | Nicholas, III ............... 715/856 |
| 6,918,091 | B2 | * | 7/2005 | Leavitt et al. ............... 715/765 |
| 2004/0135824 | A1 | * | 7/2004 | Fitzmaurice ................ 345/856 |
| 2004/0141010 | A1 | * | 7/2004 | Fitzmaurice et al. ........ 345/810 |
| 2005/0253808 | A1 | * | 11/2005 | Yoshida ..................... 345/156 |
| 2007/0226657 | A1 | * | 9/2007 | Fitzmaurice et al. ........ 715/863 |

* cited by examiner

*Primary Examiner*—Weilun Lo
*Assistant Examiner*—Tuyetlien T Tran
(74) *Attorney, Agent, or Firm*—Lee, Hong, Degerman, Kang & Waimey

(57) ABSTRACT

A method for managing a graphical user interface (GUI) control component on a display of a mobile communication terminal is provided. The method comprises displaying a GUI control component on a first location of the display; selecting the GUI control component, in response to a first user interaction with the mobile terminal; and moving the GUI control component from the first location to a second location on the display, in response to a second user interaction with the mobile terminal, wherein the GUI control component allows a user to control movement of a cursor in an input screen of the mobile communication terminal.

15 Claims, 10 Drawing Sheets

FUNCTIONAL ICON DISPLAY SYSTEM AND METHOD

CROSS REFERENCE TO RELATED APPLICATIONS

This application claims the benefit of the Korean Patent Application No. 10-2006-0034953, filed on Apr. 18, 2006, which is hereby incorporated by reference as if fully set forth herein.

FIELD OF THE INVENTION

The present invention relates to systems and methods for displaying functional icons on a display screen.

BACKGROUND OF THE INVENTION

Referring to FIG. 1, an On Screen Display (OSD) functionality is a display tool utilized in televisions, projection TVs, computers, and other display devices. The OSD function mainly provides the user with the ability to adjust image quality by way of selecting from a few menu options.

Due to recent technical advances in the related technology, OSD functionality is now available in limited display devices such as mobile communication terminals. Currently available OSD functions are generally text based and very limited in providing a user with useful options to control the graphic user interface.

Accordingly, systems and methods are needed that can overcome the above problems.

SUMMARY

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for managing a graphical user interface (GUI) control component on a display of a mobile communication terminal is provided. The method comprises displaying a GUI control component on a first location of the display; selecting the GUI control component, in response to a first user interaction with the mobile terminal; and moving the GUI control component from the first location to a second location on the display, in response to a second user interaction with the mobile terminal, wherein the GUI control component allows a user to control movement of a cursor in an input screen of the mobile communication terminal.

In one embodiment, the display is touch sensitive, and the first user interaction with the mobile terminal comprises the user touching the screen with a first object on approximately the first location to select the first GUI control component. The second user interaction may comprise the user dragging the GUI component from the first location to the second location on the display by way of moving the first object from the first location to the second location.

In one embodiment, the GUI control component comprises one or more icons, wherein each icon is associated with a function for controlling operation of the mobile device. The controlled operation comprises moving a cursor displayed on the display of the mobile terminal. The GUI control component comprises at least one icon resembling an arrow associated with a direction of movement for the cursor. In one embodiment, the display location, transparency, size or appearance of at least one of said one or more icons can be adjusted in relation to the other icons in response to user interaction.

In accordance with another embodiment, a method for managing a graphical user interface (GUI) control component on a display of a mobile communication terminal is provided. The method comprises displaying a GUI control component on the display, wherein the GUI control component comprises at least a first subcomponent and a second subcomponent such that the first subcomponent is displayed on a first location of the display and the second subcomponent is displayed on a second location of the display; selecting the first subcomponent, in response to a first user interaction with the mobile terminal; and moving the first subcomponent from the first location to a third location on the display, in response to a second user interaction with the mobile terminal, such that the second subcomponents remains in the second location.

The display is touch sensitive, and the first user interaction with the mobile terminal comprises the user touching the screen with a first object on approximately the first location to select the first subcomponent. The second user interaction comprises the user dragging the first subcomponent from the first location to the third location on the display by way of moving the first object from the first location to the third location.

In one embodiment, the first subcomponent comprises a first icon and the second subcomponent comprises a second icon, wherein each of the first and second icons are associated with a function for controlling operation of the mobile device. User interaction with the first icon moves a cursor displayed on the display of the mobile terminal in a first direction. User interaction with the second icon moves a cursor displayed on the display of the mobile terminal in a second direction.

In another embodiment, a method for managing a graphical user interface (GUI) control component on a display of a mobile communication terminal is provided. The method comprises displaying a GUI control component on a first location of the display; selecting the GUI control component, in response to a first user interaction with the mobile terminal; and adjusting display properties of the GUI control component, in response to a second user interaction with the mobile terminal. The second user interaction may comprise the user tapping the display on the first location, selecting from a GUI menu displayed on the mobile device, or pressing a key on a keypad of the mobile device.

The adjusting may comprise discontinuing to display the GUI control component on the display, changing size of the GUI control component on the display in relation to other GUI items displayed on the display or adjusting transparency level of the GUI control component on the display in relation to other GUI items displayed on the display.

In one embodiment, the adjusting may comprise changing color of the GUI control component on the display in relation to other GUI items displayed on the display, or moving the location of the GUI control component on the display in relation to other GUI items displayed on the display. In one embodiment, the GUI control component comprises a first subcomponent and a second subcomponent, the first and second subcomponents configured to adjust display properties of images on the display.

In accordance with another embodiment, a mobile communication terminal comprises a logic unit for displaying a GUI control component on a first location of the display; a logic unit for selecting the GUI control component, in response to a first user interaction with the mobile terminal; and a logic unit moving the GUI control component from the first location to a second location on the display, in response to a second user interaction with the mobile terminal.

The GUI control component allows a user to control movement of a cursor in an input screen of the mobile communication terminal. The display is preferably touch sensitive, and the first user interaction with the mobile terminal comprises the user touching the screen with a first object on approximately the first location to select the first GUI control component.

Additional advantages, objects and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

Reference will now be made in detail to the preferred embodiments of the present disclosure, examples of which are illustrated in the accompanying drawings. Wherever possible, the same reference numbers will be used throughout the drawings to refer to the same or like parts.

DETAILED DESCRIPTION OF PREFERRED EMBODIMENTS

Figure 1:
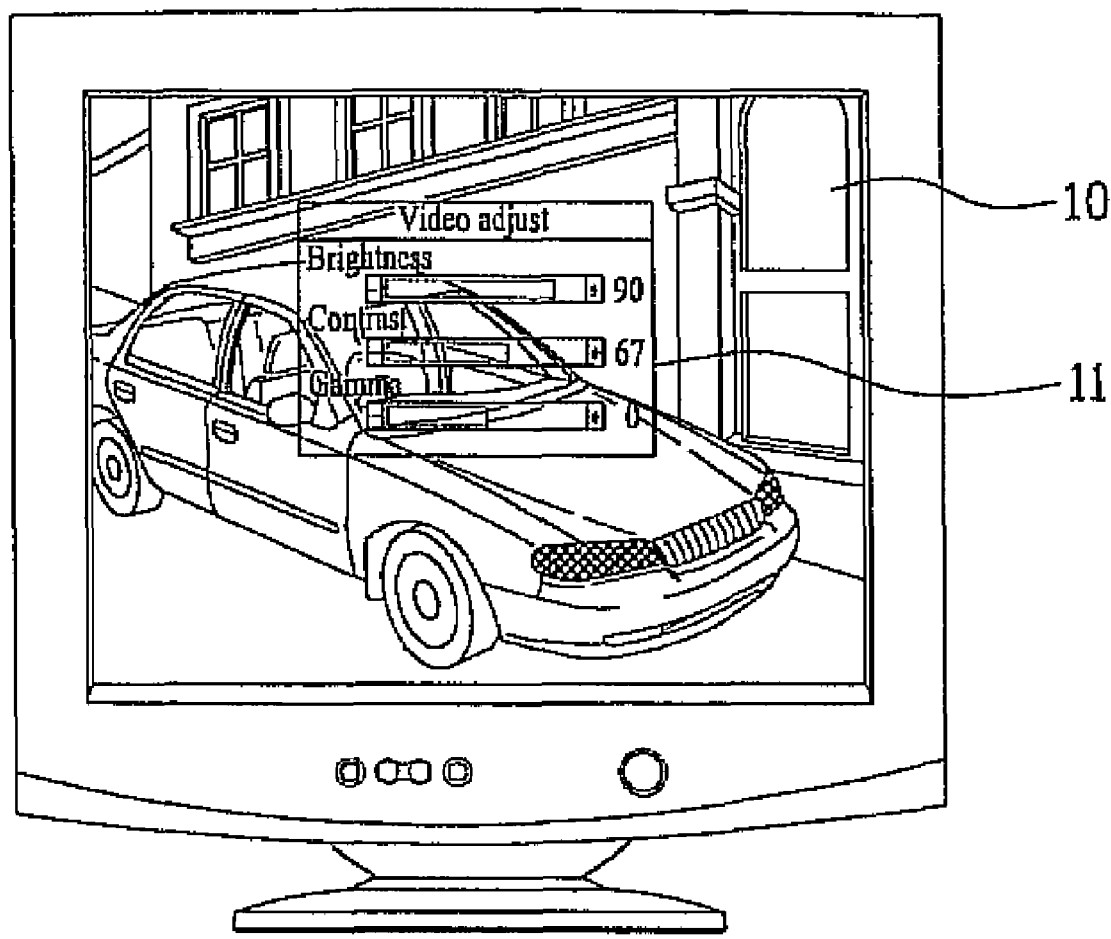
FIG. 1 is a diagram of an OSD image provided by a television according to a related art.
Figure 2:
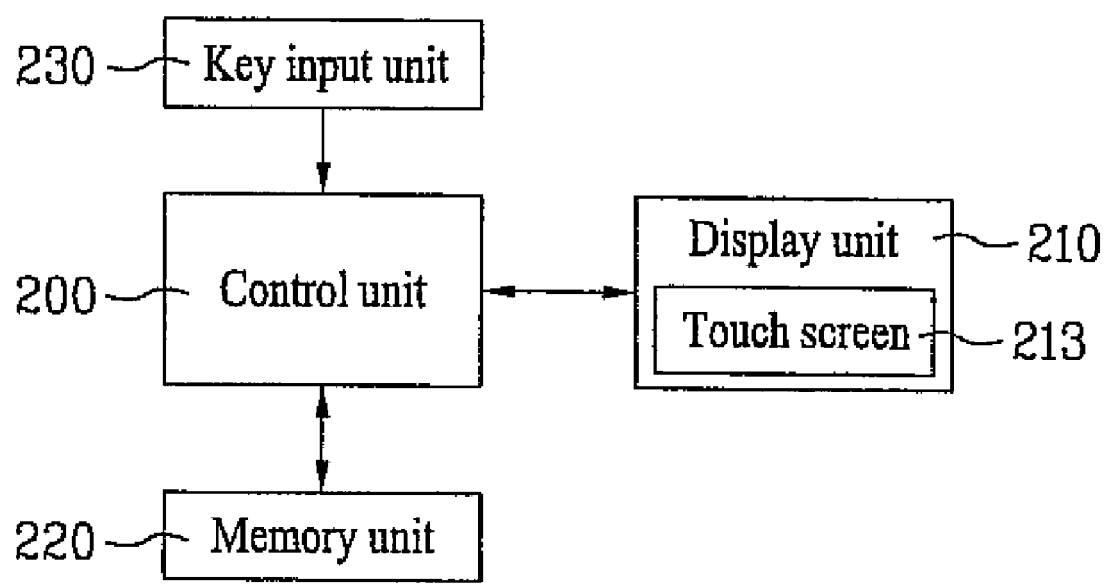
FIG. 2 is a block diagram of a mobile terminal having an OSD functional icon according to one embodiment.

Referring to FIG. 2, a mobile terminal according to one embodiment comprises a control unit 200, a display unit 210, a memory unit 220, and a key input unit 230. The display unit 210 may be provided with a touch screen 213 as an input unit or user interface, separate from the key input unit 230. The control unit 200 preferably controls the overall operation of the mobile terminal. The display unit 210 displays the status or various information about the mobile terminal and its operational features.

The memory unit 220 stores logic code that is executed to control the overall operation of the mobile terminal. The memory unit 220 may also store various data, which may be inputted, outputted, or processed by the control unit 200 in controlling the overall operation of the mobile terminal. The key input unit 230, which is provided with various numeral keys and other user interface features, is an input device for receiving various commands or information from a user.

In the following, the mobile terminal according to an exemplary embodiment is disclosed with reference to the control unit 200 in further detail. In one embodiment, the mobile terminal is a mobile communication terminal provided with a mobile communication module for communicating data in a mobile communication network. The mobile communication terminal may also transmit SMS (short message service) messages.

In one embodiment, the control unit 200 displays a functional icon having at least one function assigned thereto on the display unit 210. The control unit 200 controls the function assigned to the functional icon to be executed according to a selection of the functional icon. The functional icon may comprise a plurality of sub-icons to which different sub-functions are assigned, for example.

Figure 3:
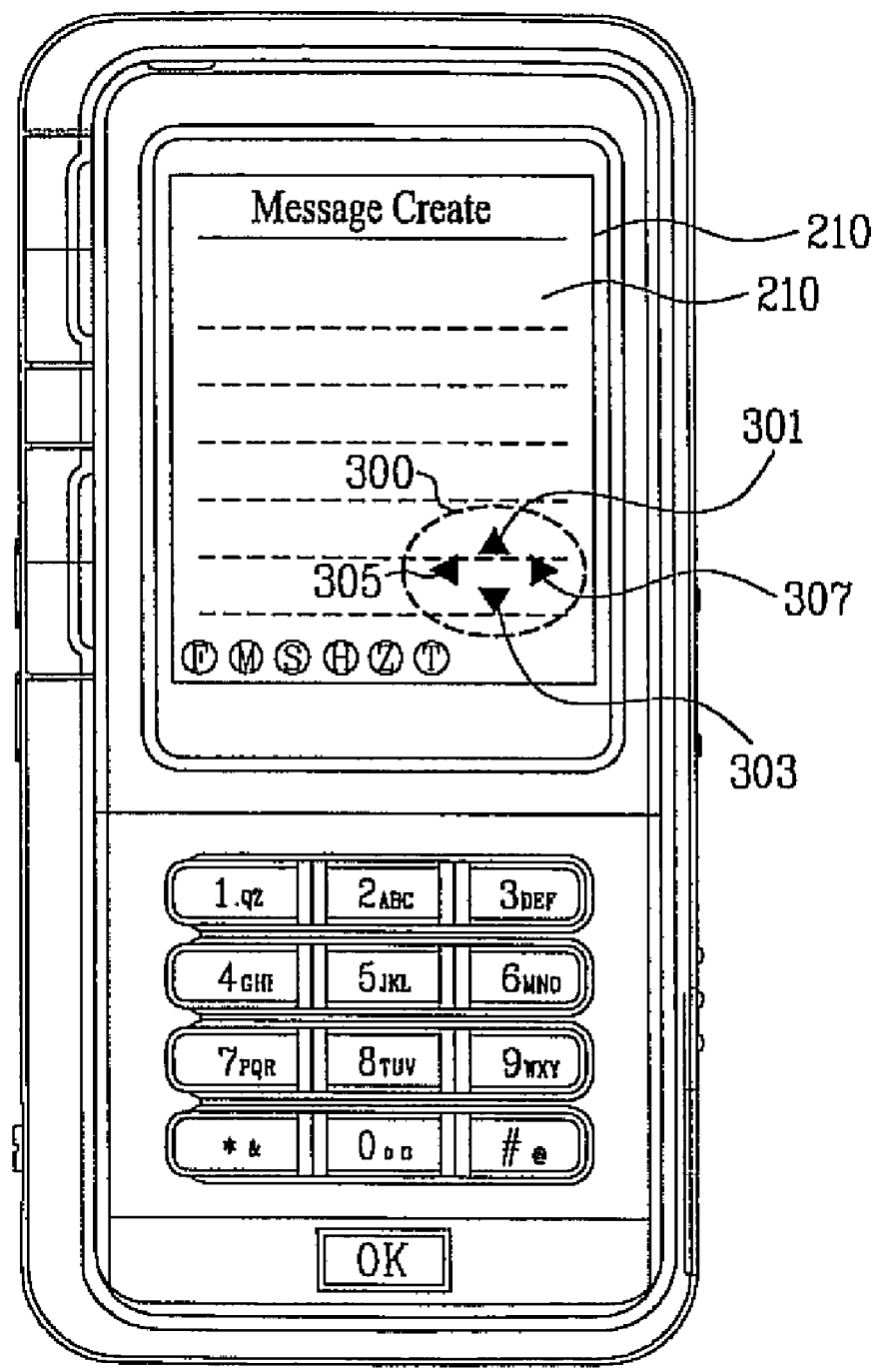
FIG. 3 is an exemplary diagram of a screen on which a functional icon is displayed by and OSD, in accordance with one embodiment.

FIG. 3 is an exemplary illustration of a screen on which a functional icon is displayed, in accordance with one embodiment. Referring to FIG. 3, a navigation function is assigned to a functional icon 300. The functional icon 300, in one embodiment, comprises four directional icons, for example, to which different directions are assigned. For example, the four directional icons may be associated with an upward icon 301, a downward icon 303, a left icon 305, and a right icon 307.

The functional icon 300 and the sub-icons 301, 303, 305 and 307 may be controlled by a setup of at least one or more control modes for controlling the functional icon and the sub-icons. The control modes of the functional icon and the sub-icons may comprise (1) function executing mode, (2) moving mode, (3) separating mode, (4) hiding mode, (5) size adjusting mode, and (6) transparency adjusting mode.

Figure 4:
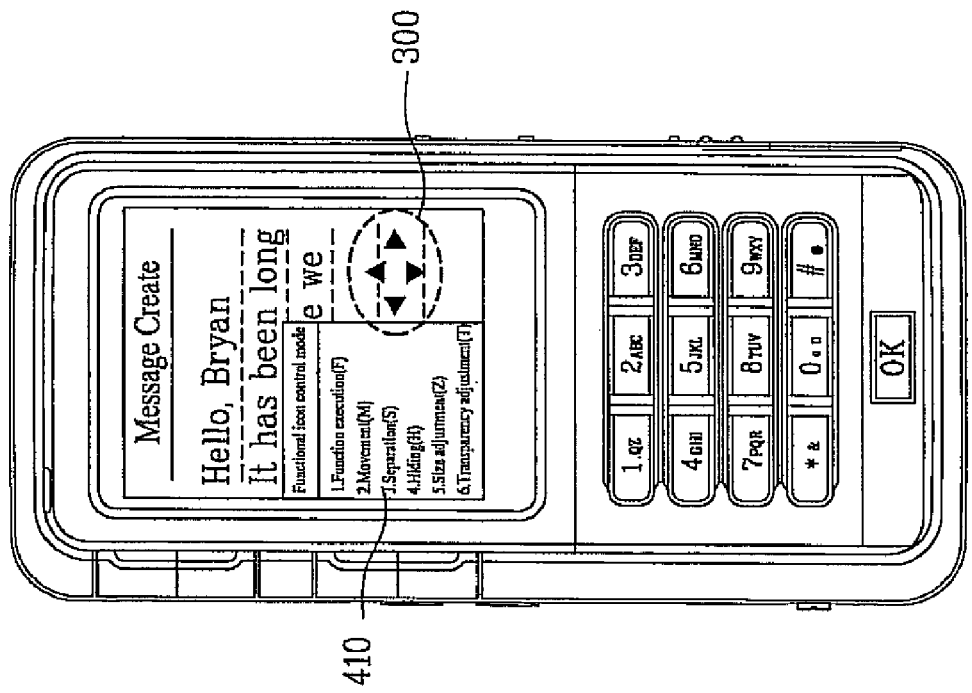
FIG. 4 is an exemplary diagram of a user interface for a control mode setup of a functional icon, in accordance with one embodiment.
Figure 4:
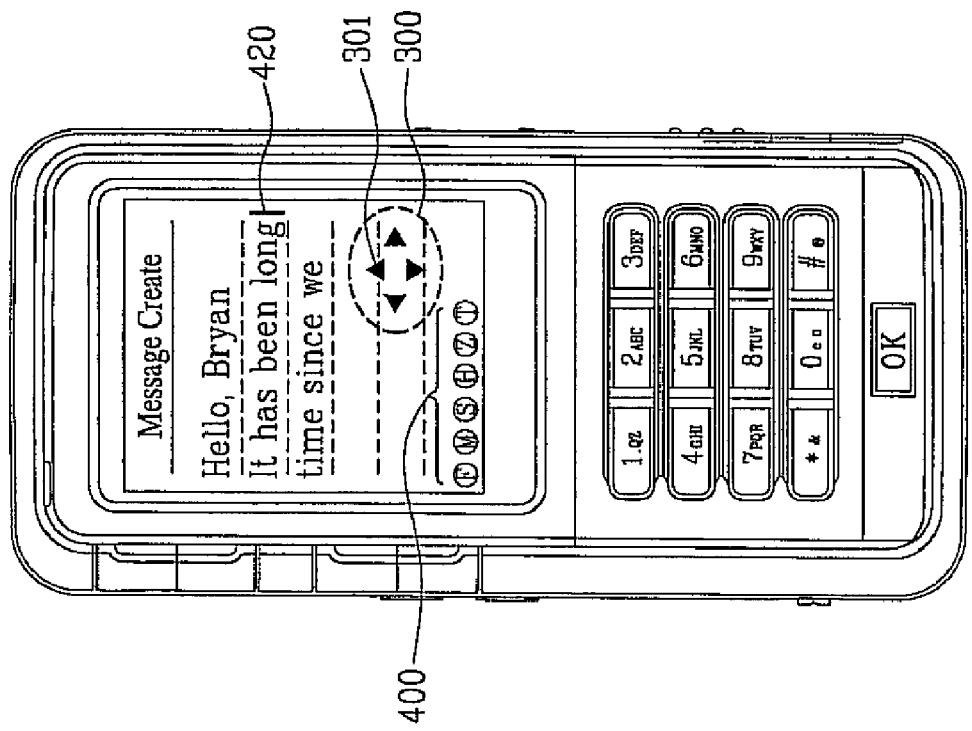

In one embodiment, at least one or more control icons 400, as shown in FIG. 4(a), for controlling the function executing mode are displayed on a first position on the display unit 210. The functional icon can be controlled by touching at least one or more control icons 400 on the touch screen 213. In another embodiment, a separate control menu window 410, as shown in FIG. 4(b), for controlling the function executing mode may be provided. The function executing mode is a control mode for executing a function assigned to an icon or executing a sub-function assigned to a sub-icon.

When an icon selected from the control icons 400 shown in FIG. 4(a), the function executing mode is activated. In the function executing mode, if a user selects a control icon using a finger, stylus pen, or equivalent thereof, the function assigned to the functional icon is executed. If, for example, in the function executing mode, the upward icon 301 shown in FIG. 4(a) is touched, a cursor 420 moves in an upward direction.

In one embodiment, the functional icon may be a navigation icon having a navigation function assigned to it. A plurality of sub-icons may be provided for a navigation icon. The sub-icons may comprise bidirectional icons, for example, to support different moving ranges in one or more directions.

Figure 5:
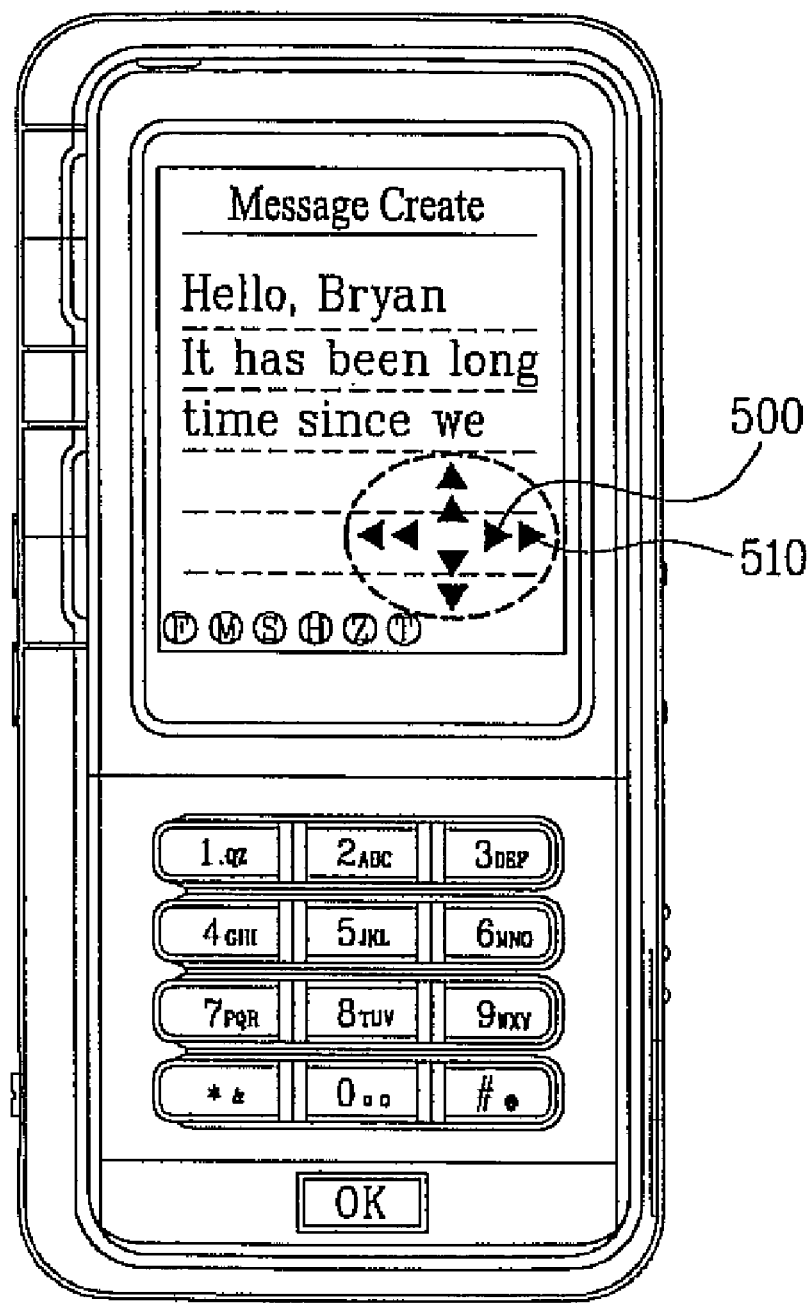
FIG. 5 is an exemplary diagram of a navigation icon having eight directional icons, in accordance with one embodiment.

FIG. 5 is a diagram of an exemplary navigation icon having eight directional icons. Referring to FIG. 5, a pair of upward direction icons, a pair of downward direction icons, a pair of left direction icons and a pair of right direction icons are displayed. In one embodiment, if a directional icon 500 is touched, the cursor moves in the right direction by one space, for example; and if a directional icon 510 is touched, the cursor moves to the right end of a current line.

In another embodiment, the pair of directional icons having the same direction assigned to them can be provided with various combinations for their moving ranges. For example, if the directional icon 500 or 510 is touched, the cursor can move in the right direction by one space. If both of the directional icons 500 and 510 are simultaneously touched, the cursor can be set to move to the right end of the current line.

In the moving mode, a user can interact with the mobile terminal to control the position of the functional icons and sub-icons on the display unit 210. For example, the functional icon and the sub-icons are characterized as being movable on the display unit 210 in accordance with an externally inputted signal.

In one embodiment, a functional icon or sub-icon can be manually moved on the touch screen 213 according to an external touch input, provided by a finger, stylus pen, or equivalent thereof. For example, the externally inputted signal may correspond to the external touch on the functional icon or the sub-icon. In this embodiment, the control unit 200 controls the displayed functional icon or sub-icon to move on the display unit 210 according to the movement of the external touch on the functional icon or the sub-icon.

Figure 6:
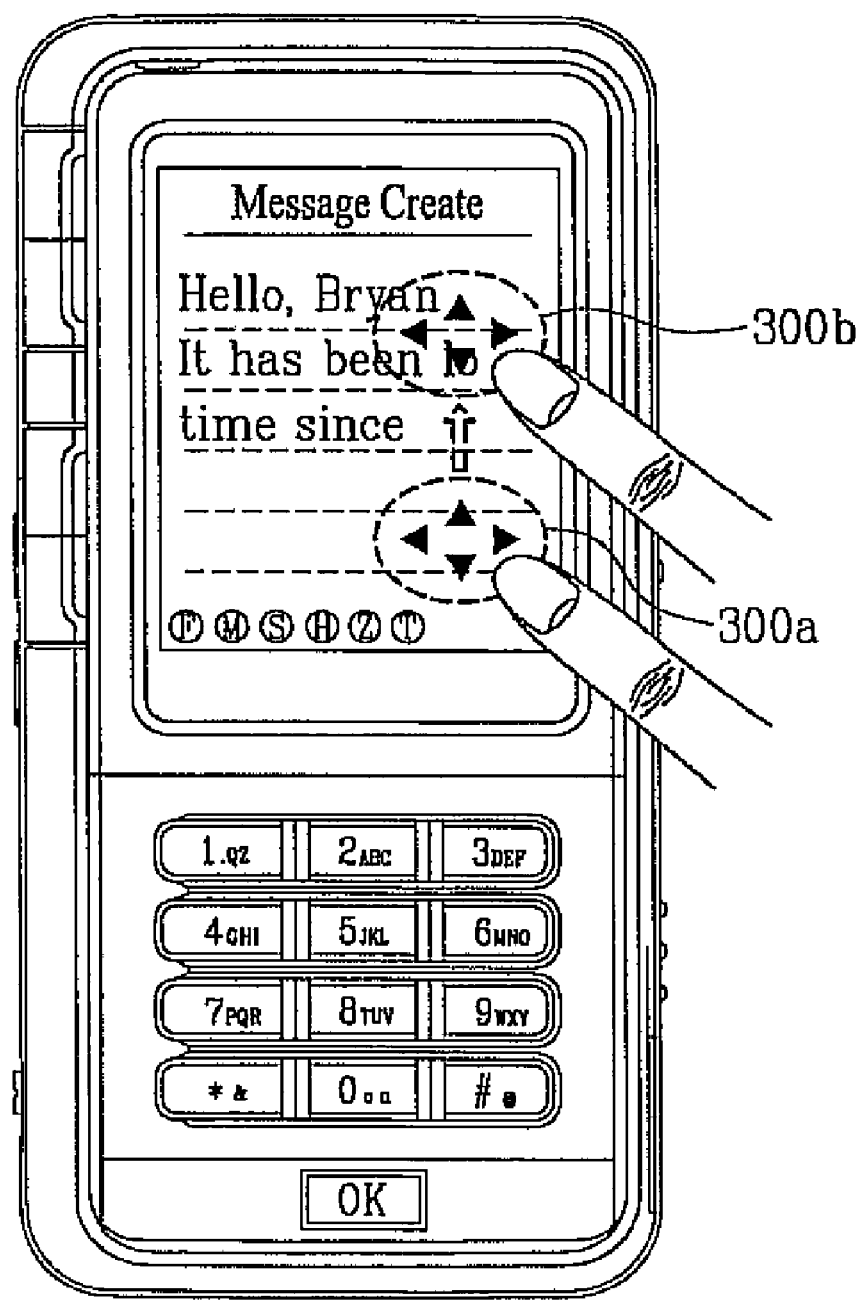
FIG. 6 is a diagram illustrating a function icon moving in response to touch input, in accordance with one embodiment.

Referring to FIG. 6, a functional icon 300 moves from a position indicated by reference number 300a to a position indicated by reference number 300b according to the movement of a finger. In another embodiment, the functional icon or the sub-icon is automatically moved to a predetermined position on the display unit 210 according to an externally inputted signal.

In an auto moving mode, for example, the control unit 200 controls the functional icon or the sub-icon to move to a first position on the display unit 210 according to the externally inputted signal. For example, if the control icon for the moving mode is selected from the control icons 400 shown in FIG. 4(a), the functional icon or the sub-icon is automatically moved to a first position within the display unit 210.

In another embodiment the functional icon or the sub-icon can move to a predetermined position within the display unit 210 after receiving an input signal via the key input unit 230, for example. If the functional icon comprises a plurality of sub-icons, in a separating mode, a user may interact with the mobile terminal to separate at least one sub-icon from a plurality of the sub-icons.

In one embodiment, the control unit 200 controls at least one of a plurality of sub-icons displayed on the display unit 210 to be separated from the rest of the sub-icons according to an externally inputted signal. For example, if an externally inputted signal touches a sub-icon such that it calls for the separation of one of a plurality of the sub-icons on the touch screen 213, the control unit 200 controls the touched sub-icon to be separated to move from the rest of the sub-icons according to the movement of the external touch.

Figure 7:
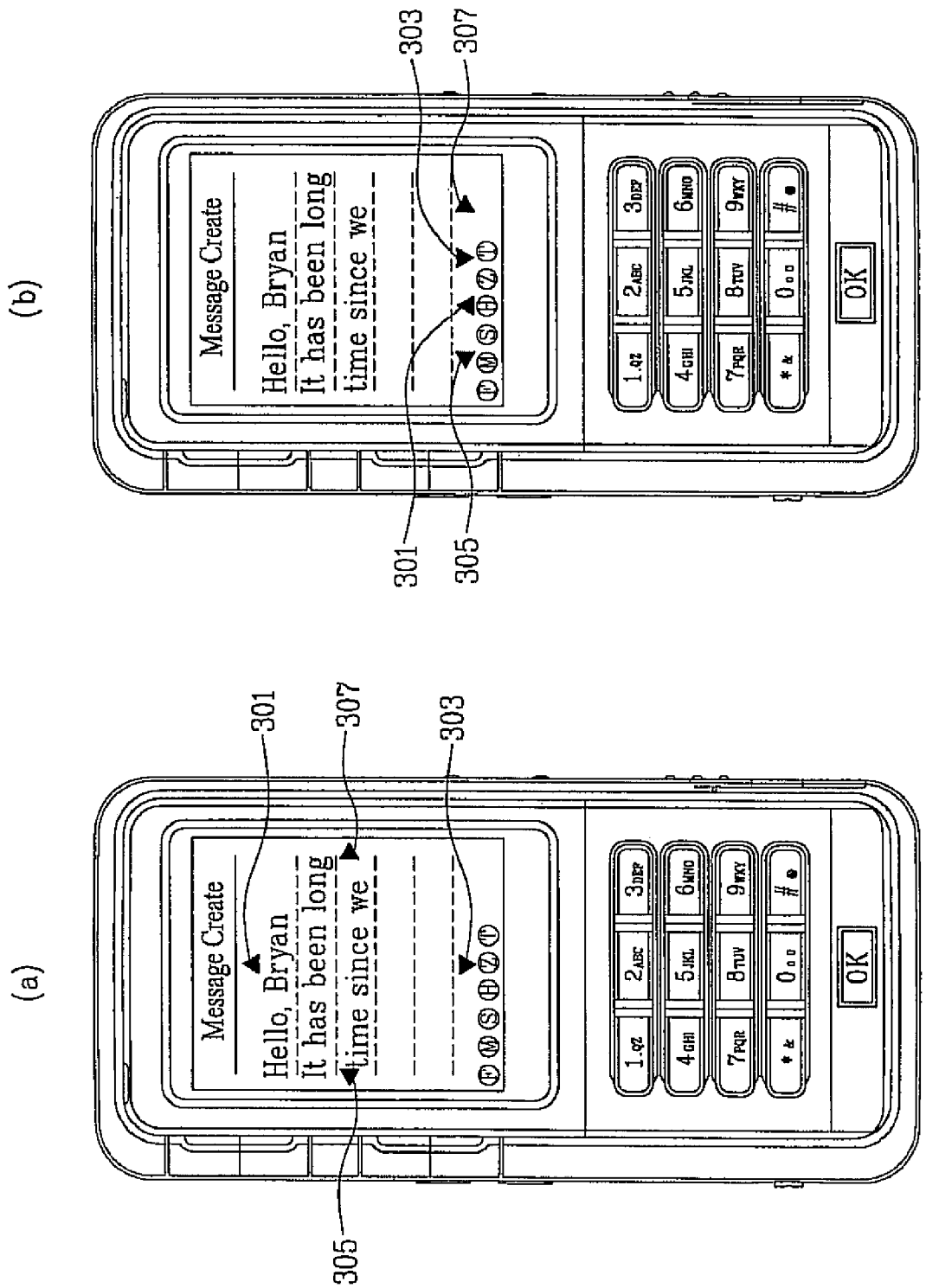
FIG. 7 is a diagram illustrating the directional icons in FIG. 3, in which the directional icons can move in separate directions, in accordance with one embodiment.

In another embodiment, the control unit 200 controls at least one of a plurality of the sub-icons to automatically move to a predetermined position on the display unit 210 according to an externally inputted signal. FIG. 7 is an exemplary illustration for the directional icons in FIG. 3, in which separate motions of the directional icons are shown.

In accordance with one or more embodiments, a hiding mode is implemented to control the appearance or disappearance of the functional icons or sub-icons on the display unit 210. If the hiding mode is entered in accordance to an externally inputted signal, the control unit 200 will not display the functional icon or at least one sub-icon selected from a plurality of sub-icons on the display unit 210.

In one embodiment, if a user touches the functional icon or one of a plurality of the sub-icons on the touch screen 213, the touched functional icon or the touched sub-icon disappears from the display unit 210. The functional icon or the sub-icon having disappeared from the display unit 210 can be displayed again on the display unit 210 by a command signal from the user.

Figure 8:
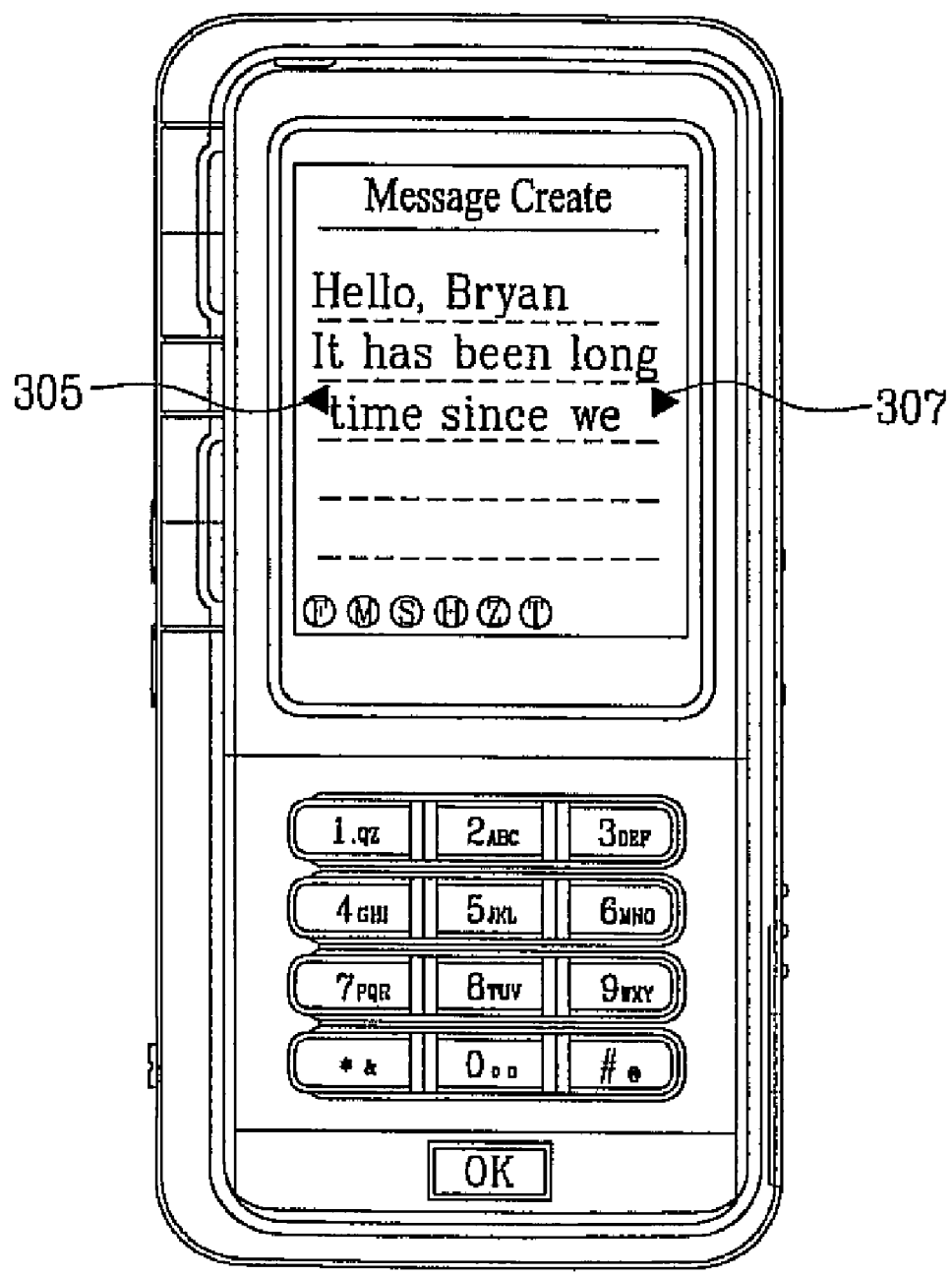
FIG. 8 is a diagram illustrating a hide feature, in accordance with one embodiment.
Figure 9:
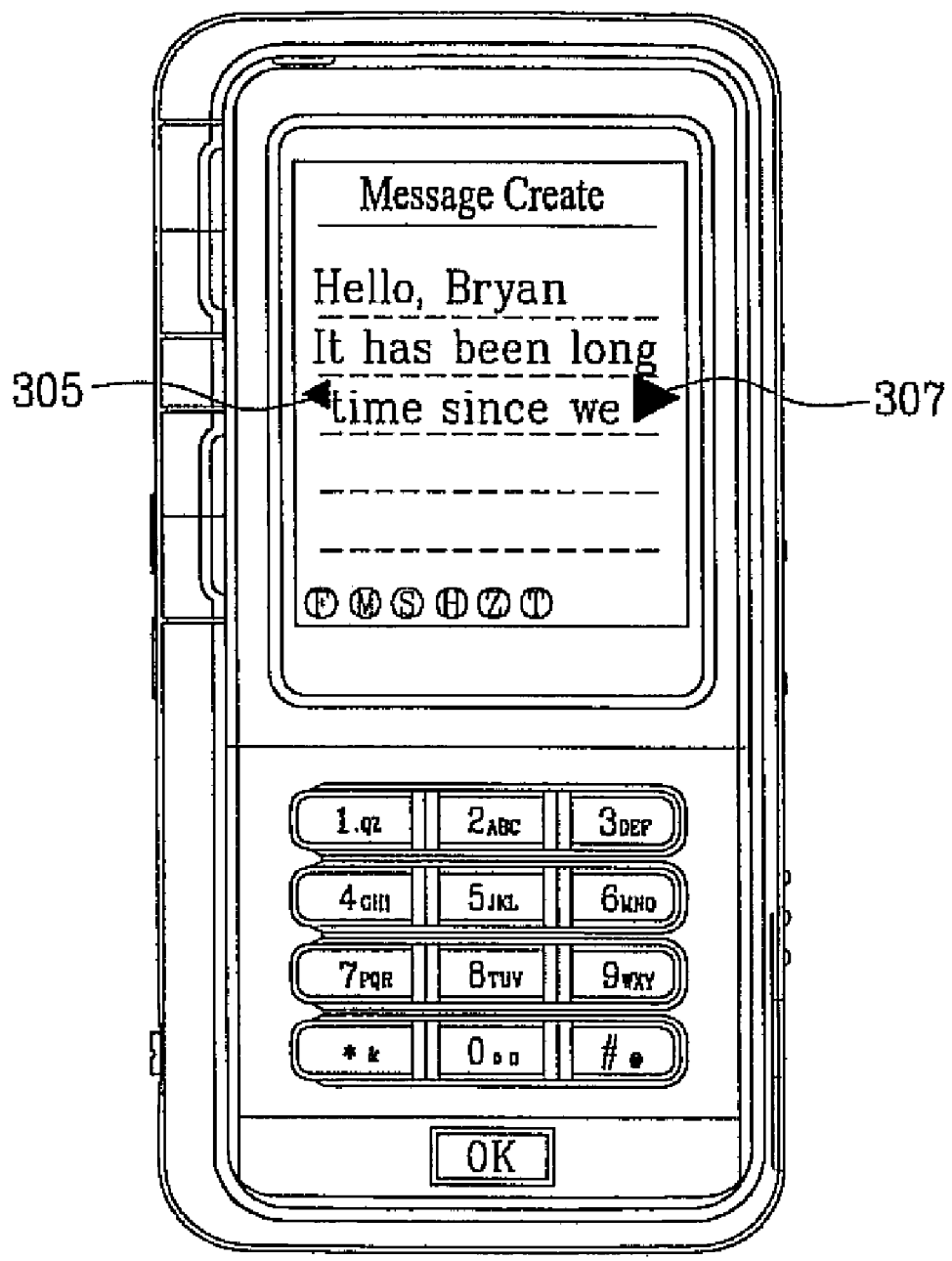
FIG. 9 is an exemplary diagram of a screen, in which left and right icons differ from each other in size, in accordance with one embodiment.

In another embodiment, hiding or displaying an icon or sub-icon may be automatically decided according to an execution frequency of the corresponding function. The control unit 200 controls whether to display each of the icons or sub-icons according to the execution frequency of the assigned function. FIG. 8 is an exemplary diagram illustrating the hidden mode for upward and downward icons among the directional icons shown in FIG. 7(a).

In accordance with one embodiment, a size adjusting mode is implemented. The size adjusting mode is a control mode for adjusting a displayed size of a functional icon or a sub-icon. The control unit 200 can control the size of a functional icon displayed on the display unit 210 according to an externally inputted signal.

Accordingly, a user can increase or decrease a displayed size of the functional icon by dragging a corner of the function icon in the size adjusting mode, for example. The control unit 200 may control the size of each of the sub-icons displayed on the display unit 210 according to an externally inputted signal or an execution frequency of a sub-function assigned to each of the sub-icons. For example, if an execution frequency of the directional icon having a right direction assigned thereto is high, a displayed size of the directional icon having the right direction assigned thereto can be increased.

In one embodiment, a transparency adjusting mode is implemented. The transparency adjusting mode is a control mode for adjusting transparency of the displayed functional icon or sub-icon. The transparency can be adjusted through various embodiments. In one embodiment, the control unit 200 varies transparency of the functional icon or each of the sub-icons according to an externally inputted signal. For example, if the control icon having the transparency adjusting mode assigned thereto is selected from the control icons 400 shown in FIG. 4(a), the transparency adjusting mode is entered as soon as a transparency adjusting window bar is provided. A user is able to adjust the transparency of the function icon or each of the sub-icons via the transparency adjusting window bar.

In another embodiment, the control unit 200 varies transparency of the functional icon or each of the sub-icons according to the execution frequency of a sub-function assigned to each of the sub-icons. For example, if an execution frequency of one of the sub-icons is low, the corresponding icon is displayed dim by increasing the transparency level of the corresponding sub-icon.

In another embodiment, the control unit 200 varies transparency of the functional icon or each of the sub-icons according to the position of the functional icon or each of the sub-icons displayed on the display unit 210. For example, in FIG. 7(a), the upward directional icon overlaps the characters to be displayed. In this case, by increasing the transparency level of the upward directional icon, characters can be more clearly displayed on the display unit 210.

Figure 10:
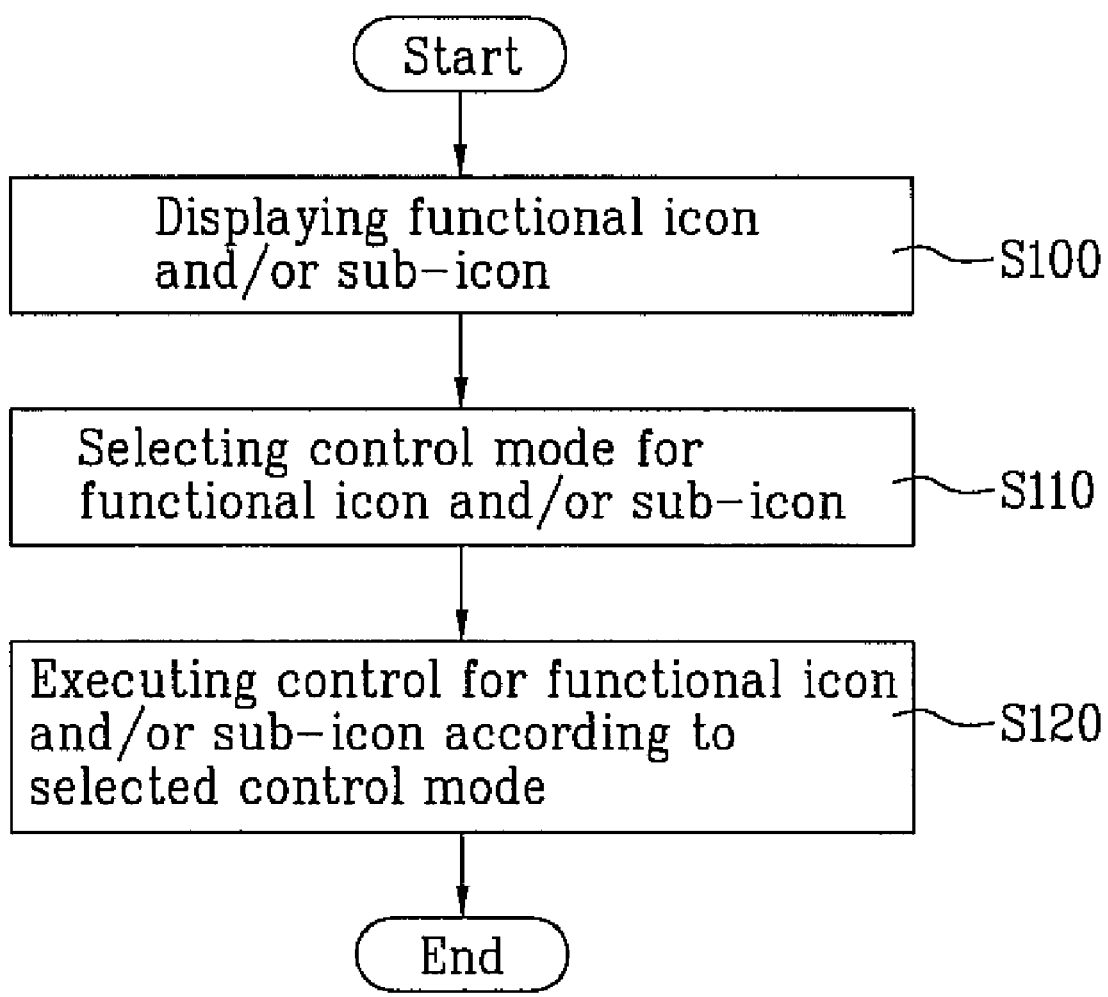
FIG. 10 is a flowchart of a method of displaying an OSD functional icon in a mobile terminal in accordance with one embodiment.

Referring to FIG. 10, a functional icon having at least one function assigned thereto is displayed on the display unit 210. As mentioned in the foregoing description, the functional icon may comprise a plurality of sub-icons to which different sub-functions are assigned.

In one embodiment, functional icons or sub-icons are displayed on a display screen (S100). A control mode for controlling the functional icon or the sub-icon is selected (S110). The control mode may comprise at least one of (1) a function executing mode, (2) a moving mode, (3) a separating mode, (4) a hiding mode, (5) a size adjusting mode or (6) a transparency adjusting mode.

The control mode can be selected through various methods. In one embodiment, the control mode may be actively selected by a user or automatically selected by the mobile terminal. The control mode selection made by a user can be carried out using a user interface provided by the mobile terminal. The auto selection may be achieved by the default.

Depending on the control mode selected, a control for the functional icon or the sub-icon is carried out (S120). In one embodiment, in the function selecting mode, once the functional icon or the sub-icon is selected, the function assigned to the corresponding functional icon or sub-icon is executed.

In another embodiment, in moving mode, the displayed function icon or sub-icon is moved on the display unit 210 according to an externally inputted signal. The predetermined externally inputted signal can be a movement of an external touch for the functional icon or the sub-icon on the touch screen 213.

In another embodiment, in the separating mode, at least one of a plurality of the sub-icons displayed on the display unit 210 is separated to move from the rest of the sub-icons in accordance to an externally inputted signal.

In another embodiment, in the hiding mode, whether to display or hide the functional icon or the sub-icon is determined according to an externally inputted signal or a use frequency. For example, the functional icon or at least one of a plurality of the sub-icons can be hidden or displayed.

In another embodiment, in the size adjusting mode, a size of the functional icon or the sub-icon can be changed according to an externally inputted signal or a use frequency. In the transparency adjusting mode, the transparency of the functional icon or the sub-icon can be adjusted according to a externally inputted signal, a use frequency, or a position displayed on the display unit 210.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal having an On Screen Display (OSD) functional icon, the mobile terminal comprising:
    a display unit; and
    a control unit controlling a functional icon having at least one function assigned thereto to be displayed on the display unit by OSD, the control unit controlling the function assigned to the functional icon to be executed if the functional icon is selected,
    wherein the functional icon is movable on the display unit according to a predetermined external signal, and transparency of the functional icon is varied according to a position displayed on the display unit;
    wherein the functional icon comprising a plurality of sub-icons to which different sub-functions are assigned, respectively,
    if one of a plurality of the sub-icons is selected, the control unit controls the sub-function assigned to the selected sub-icon to be executed;
    wherein the display unit comprises a touch screen, the prescribed signal inputted externally corresponds to a movement of an external touch for one of a plurality of the sub-icons on the touch screen and the control unit controls the touched sub-icon to be moved separate from the rest of the sub-icons according to the movement of the external touch; and
    the control unit decides whether to display each of a plurality of the sub-icons, according to an execution frequency of the sub-function assigned to each of a plurality of the sub-icons.

2. A mobile terminal having an On Screen Display (OSD) functional icon, the mobile terminal comprising:
    a display unit comprises a touch screen; and
    a control unit controlling a functional icon having at least one function assigned thereto to be displayed on the display unit by OSD, the control unit controlling the function assigned to the functional icon to be executed if the functional icon is selected,
    wherein the functional icon is movable on the display unit according to a predetermined external signal;
    wherein transparency of the functional icon is varied according to a position displayed on the display unit;
    the predetermined external signal corresponds to a movement of an external touch for the functional icon on the touch screen and the control unit controls the displayed functional icon to be moved according to the movement of the external touch;
    wherein the functional icon comprising a plurality of sub-icons to which different sub-functions are assigned, respectively,
    if one of a plurality of the sub-icons is selected, the control unit controls the sub-function assigned to the selected sub-icon to be executed; and
    the control unit decides whether to display each of a plurality of the sub-icons, according to an execution frequency of the sub-function assigned to each of a plurality of the sub-icons.

3. The mobile terminal having the OSD functional icon of claim 1, wherein the control unit controls the functional icon to be automatically moved to a prescribed position on the display unit according to the predetermined external signal.

4. The mobile terminal having the OSD functional icon of claim 1, wherein a plurality of the sub-icons are movable and separable from each other.

5. The mobile terminal having the OSD functional icon of claim 4, wherein the control unit controls each of the displayed sub-icons to be moved according to the predetermined external signal.

6. The mobile terminal having the OSD functional icon of claim 4, wherein the control unit controls at least one of a plurality of the sub-icons to be automatically moved to a prescribed position on the display unit according to the predetermined external signal.

7. The mobile terminal having the OSD functional icon of claim 1, wherein the functional icon is a navigation icon and wherein a plurality of the sub-icons are directional icons having corresponding directions assigned thereto, respectively.

8. The mobile terminal having the OSD functional icon of claim 7, wherein a plurality of the sub-icons include at least two directional icons to which a same direction is assigned and wherein the at least two directional icons differ from each other in a moving range in the same direction.

9. A method of displaying an On Screen Display (OSD) functional icon in a mobile terminal, the method comprising:

displaying a functional icon, having at least one function assigned thereto, on a display unit of the terminal by OSD; and moving the displayed functional icon on the display unit according to a predetermined external signal, wherein transparency of the functional icon is varied according to a position displayed on the display unit;

wherein the functional icon includes a plurality of sub-icons to which different sub-functions are assigned, respectively, if one of a plurality of the sub-icons is selected, the control unit controls the sub-function assigned to the selected sub-icon to be executed;

wherein the display unit comprises a touch screen, the prescribed signal inputted externally corresponds to a movement of an external touch for one of a plurality of the sub-icons on the touch screen and the control unit controls the touched sub-icon to be moved separate from the rest of the sub-icons according to the movement of the external touch; and it is decided whether to display each of a plurality of the sub-icons, according to an execution frequency of the sub-function assigned to each of a plurality of the sub-icons.

10. The method of claim 9, further comprising executing a function assigned to the functional icon if the functional icon is selected.

11. The method of claim 9, wherein a plurality of the sub-icons are movable and separable from each other.

12. The method of claim 9, wherein the functional icon is a navigation icon and wherein a plurality of the sub-icons are directional icons having corresponding directions assigned thereto, respectively.

13. The method of claim 12, wherein a plurality of the sub-icons include at least two directional icons to which a same direction is assigned and wherein the at least two directional icons differ from each other in a moving range in the same direction.

14. The mobile terminal having the OSD functional icon of claim 1, wherein a displayed size of the functional icon is adjustable.

15. The method of claim 9, wherein a displayed size of the functional icon is adjustable.

* * * * *